United States Patent [19]

Papst et al.

[11] 4,248,623
[45] Feb. 3, 1981

[54] PROCESS FOR THE DIRECT REDUCTION OF IRON ORES

[75] Inventors: Gero Papst, Buxtehude; Günther Röpke, Hamburg, both of Fed. Rep. of Germany; Hans J. Töpfer, deceased, late of Buxtehude, Fed. Rep. of Germany, by Marion Margret Gesine Töpfer nee Block, heir

[73] Assignee: Hamburger Stahlwerke GmbH, Hamburg, Fed. Rep. of Germany

[21] Appl. No.: 18,977

[22] Filed: Mar. 9, 1979

[30] Foreign Application Priority Data

Mar. 11, 1978 [DE] Fed. Rep. of Germany ....... 2810657

[51] Int. Cl.³ .............................................. C21B 13/02
[52] U.S. Cl. ............................................ 75/35; 75/91
[58] Field of Search ..................... 75/26, 34, 35, 91; 266/172, 186

[56] References Cited

U.S. PATENT DOCUMENTS

| | | | |
|---|---|---|---|
| 2,591,789 | 4/1952 | De Jahn | 75/34 |
| 3,098,738 | 7/1963 | Madaras | 75/34 |
| 4,046,557 | 9/1977 | Beggs | 75/34 |
| 4,118,017 | 10/1978 | Hendrickson | 266/187 |

Primary Examiner—M. J. Andrews
Attorney, Agent, or Firm—Ralph H. Dougherty

[57] ABSTRACT

A process for the direct reduction of iron ore in a shaft furnace having an upper reducing zone and a lower cooling zone in which reducing gas is introduced to the furnace at the bottom of the reducing zone around the periphery of the furnace, exhausted reducing gas or top gas is removed from the top of the furnace, cleaned, mixed with additional hydrocarbons, and reinjected into the furnace below the reducing zone. The hot reducing gas is injected serially into different sectors of the cross-section of the furnace and at varying velocities to force upflowing cleaned top gas to change its flow path or its flow rate, or both, periodically. Apparatus for accomplishing the method is also disclosed.

17 Claims, 8 Drawing Figures

PROCESS FOR THE DIRECT REDUCTION OF IRON ORES

BACKGROUND OF THE INVENTION

This invention relates to a process and apparatus for the direct reduction of iron ores in a reduction furnace charged from above, such as a shaft furnace, wherein hot reducing gas is blown into a reduction zone in the furnace containing a packed bed burden of ore and waste gas or exhausted top gas is removed from the furnace above the reduction zone. Such a process is known from German published patent application No. 17 83 180 in which exhausted reducing gas is withdrawn from the reduction zone, passed through a gas scrubbing operation and a water removal operation, enriched with methane and reintroduced into the lowest section of the shaft furnace, which is a cooling zone, in which it comes into contact with hot reduced pellets. The gases move in counter-flow relationship with the downwardly flowing hot pellets, cooling the pellets and heating the gases which rise upwardly into the reduction zone. The hot pellets act as catalysts, thus when the waste gases, or top gases, enter the reduction zone carbon dioxide and methane are converted to carbon monoxide and hydrogen in accordance with the following gas reforming reaction:

$$CO_2 + CH_4 \rightarrow 2CO + 2H_2$$

The reducing gas so formed operates as a reductant for the direct reduction of the iron oxide burden in the reduction zone. The reference also teaches that part of the cooled waste gas may be removed before the methane enrichment procedure and introduced into a middle region of the shaft furnace for temperature control purposes.

U.S. Pat. No. 4,046,557 discloses a shaft furnace direct reduction process, wherein a part of the cooling gas within the furnace flows upwardly from the cooling zone into the reduction zone. Top gas and natural gas can be added to the prepared cooling gas, the gas being reformed to reducing gas in the shaft furnace, in accordance with the following reactions:

$$CH_4 + CO_2 \longrightarrow 2CO + 2H_2$$

$$CH_4 + H_2O \longrightarrow 3H_2 + CO$$

A reduction shaft furnace is usually fed with hot reduction gas from the periphery. When natural gas or spent top gas in injected below the hot reduction gas injection plane, for example into the cooling zone, the upwardly rising gas is forced inwardly to the center of the shaft. When large quantities of cooling gas flow upwardly through the center of the shaft furnace, the burden becomes excessively cooled which slows the ore reduction process. Metallization of the sponge iron produced is impaired. The amount of cracking gas which can be produced by the reaction of methane on the hot sponge iron is also reduced.

The invented process will prevent excess localized cooling within the reduction zone, provide a high degree of iron ore metallization and provide generally uniform reduction of the burden throughout its entire cross-section. When natural gas is introduced to the furnace below the reducing zone, either in concentrated form or mixed with cleaned spent top gas, the heat content of the reduced sponge iron burden is more effectively utilized for in situ reforming of the natural gas to reducing gas than it is in the previously known processes.

OBJECTS OF THE INVENTION

It is the principal object of this invention to provide a process and apparatus for direct reduction of iron ore which will prevent excessive localized cooling of the burden in a shaft furnace reducing zone.

It is also an object of this invention to provide a process for the direct reduction of iron ore having a high degree of iron ore reduction.

It is another object of this invention to provide a process for reducing an iron ore burden in a shaft furnace uniformly throughout the entire cross-section of the burden.

It is still another object of this invention to provide a process for better utilizing the heat content of the reduced sponge iron burden to reform spent top gas and/or methane introduced beneath the reducing zone than was heretofore possible.

SUMMARY OF THE INVENTION

The objects of this invention are achieved by introducing spent top gas, methane, or a combination thereof into a shaft furnace beneath the reducing zone, allowing such gas to rise upwardly through the burden into the reducing zone while being thermally reformed into a reducing gas mixture, then selectively displacing this reformed reducing gas mixture into different regions of the cross-section of the reducing zone by controlling the flow of hot reducing gas through the reducing gas inlets to vary its velocity and direction of flow through the burden.

BRIEF DESCRIPTION OF THE DRAWINGS

This invention is better understood by reference to the following detailed description and the appended drawings in which.

DETAILED DESCRIPTION

Figure 1:
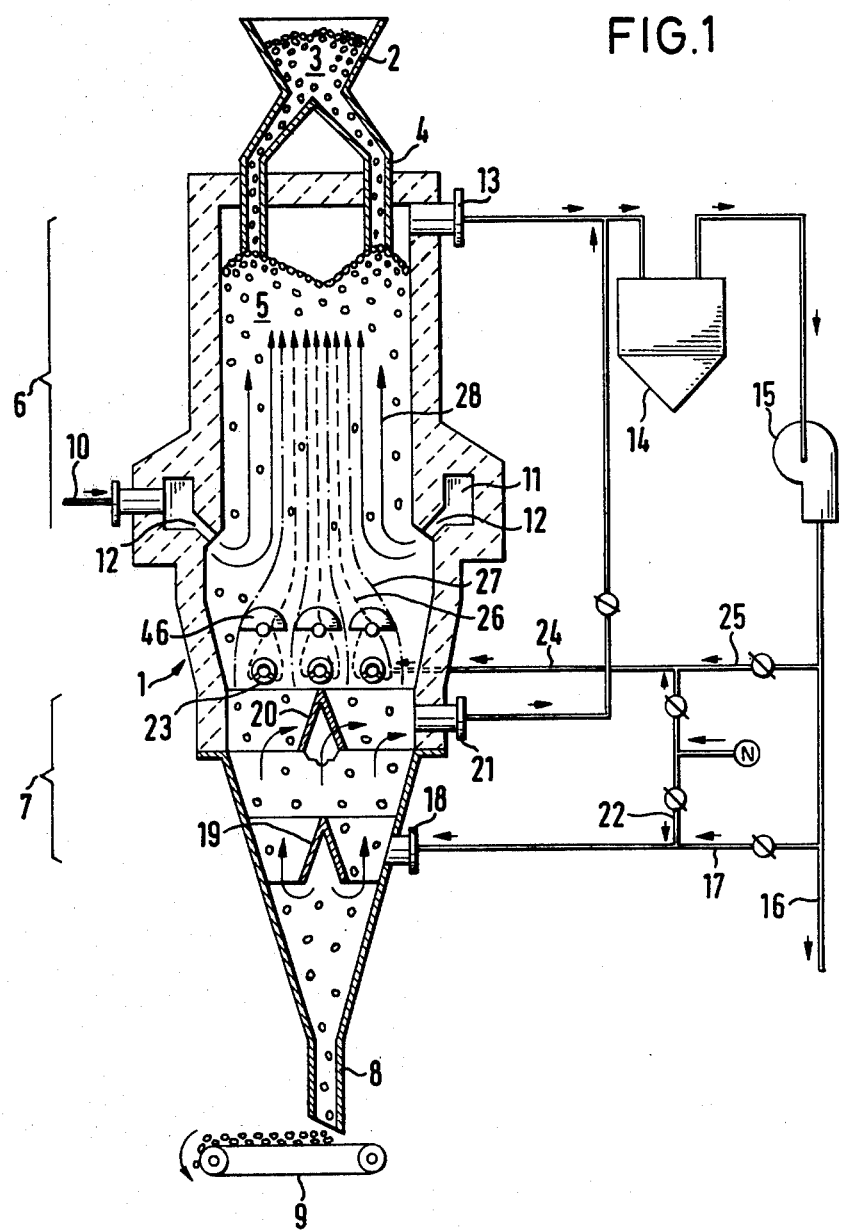
FIG. 1 is a schematic vertical section of a shaft furnace and related equipment in accordance with the present invention.

Referring now to FIG. 1, a shaft furnace 1 has a charging hopper 2 for charging iron oxide pellets 3 or other material such as lump ore through feed tubes 4 into the interior of furnace 1 to form a burden 5 of particulate iron oxide bearing material therein. The shaft furnace has an upper reduction zone 6 and a lower cooling zone 7. A pellet discharge pipe 8 is provided at the bottom of the shaft furnace. Cooled metallized pellets are removed by conveyor 9 to establish a gravitational flow of the pellet burden downwardly through the furnace. Reducing gas, which has been produced from gaseous hydrocarbons and cleaned spent top gas in a conventional gas reformer (not shown), is introduced through gas supply pipe 10 to a bustle system 11 having a plurality of downwardly inclined gas passages 12 through which the gas enters the furnace to flow upwardly in counter-flow relation with the downwardly descending burden. The reacted reducing gas is removed from the furnace at gas outlet 13 in the form of top gas, then conducted to a gas washer 14 wherein it is cleaned. Blower 15 conducts the cleaned top gas through conduit 16 to a reformer for production of reducing gas. In the preferred embodiment shown in FIG. 1, top gas in part is conducted through conduit 17 and cooling gas inlet 18 to gas distributor member 19 at the lower end of the cooling zone 7 within the furnace. At the upper end of the cooling zone, a portion of the cooling gas is collected by cooling gas collecting member 20 and removed from the furnace by way of cooling gas outlet 21 from whence it is recycled to gas washer 14. A source of natural gas N is connected to conduit 17 by conduit 22 whereby natural gas can be added to the recycled cooling gas and top gas mixture.

Below the plane of bustle 11 in which the hot reduction gas is injected into the furnace, natural gas mixed with top gas is introduced into the reduction furnace. This can be effected by horizontal gas distributor pipes 23 incorporated into the furnace or alternatively by a second set of peripheral injection nozzles in a lower plane having its own bustle gas conduit.

In a preferred embodiment of the invention shown in FIG. 1 natural gas is supplied to gas distributor pipes 23 by a conduit 24 below the reduction zone. Disposed above the gas distributor pipes 23 are cluster breakers 46. Top gas supplied by conduit 25 may be mixed with the natural gas from natural gas supply N.

The natural gas or natural gas top gas mixture issuing from the gas distributor pipes 23 rises through the burden substantially in the manner indicated by broken lines 26 and initially reacts in concentrated form on the sponge iron. As it rises into the hotter regions of the furnace, it is gradually mixed with the cooling gas which rises from the lower portion of the furnace and is indicated by dash-dotted lines 27. Thus, as the upwardly flowing gas meets higher temperature sponge iron, a natural gas which is increasingly strongly mixed with top gas is available so that the supply of $CO_2$ and $H_2O$ required for cracking the natural gas continuously increases. Cracking of the natural gas is also effected to a lesser extent by reaction with $H_2O$ and $CO_2$ formed in the ore reduction step.

This mode of operation is based on the recognition that, at low temperatures, a gas mixture with a high proportion of natural gas must be supplied to the sponge iron. In this way it is possible to achieve natural gas cracking on the sponge iron down to temperatures of about 450° C., thus providing very economical utilization of the heat content of the sponge iron. In contrast, as temperatures rise, a higher proportion of top gas in the natural gas top gas mixture is desirable.

The gas mixture which flows upwardly into the reduction zone 6 has a tendency to be forced toward the center of the shaft furnace by the reduction gas injected from the periphery, as shown by solid lines 28. This occurs not only when a cooling zone 7 is employed in the reduction furnace, as shown in FIG. 1, but whenever a cold or pre-heated hydrocarbon-top gas mixture is introduced into the shaft furnace below the plane in which the hot reduction gas is injected. This causes the central part of the burden to be cooled more than the average, and this not only restricts the amount of crackable natural gas, but also reduces the iron ore in a non-uniform manner over the cross-section of the shaft furnace.

This invention prevents non-uniform reduction of the burden by successively displacing the upwardly flowing hydrocarbon-top gas mixture into different regions of the cross-section of the reduction zone, by a hot reduction gas flow which varies periodically in direction and/or a reduction gas flow which varies periodically in flow rate or velocity.

Figure 2:
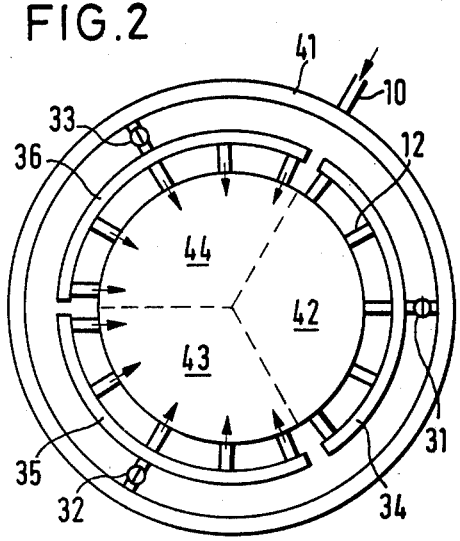
FIG. 2 is a diagrammatic cross-section of the shaft furnace of FIG. 1 taken through the hot gas bustle section.
Figure 4:
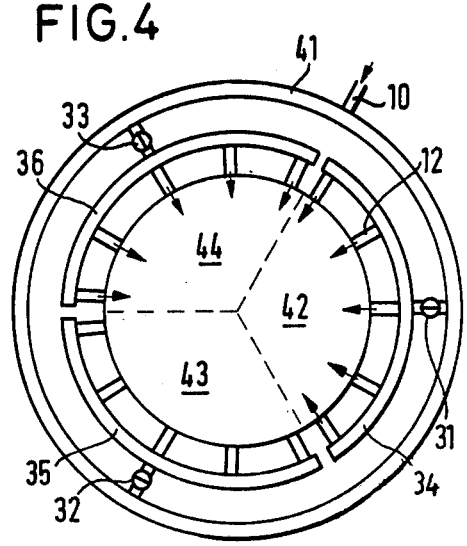
FIG. 4 is a cross-sectional view of the furnace taken through the bustle in the same manner as FIG. 2 but with different valve settings.
Figure 3:
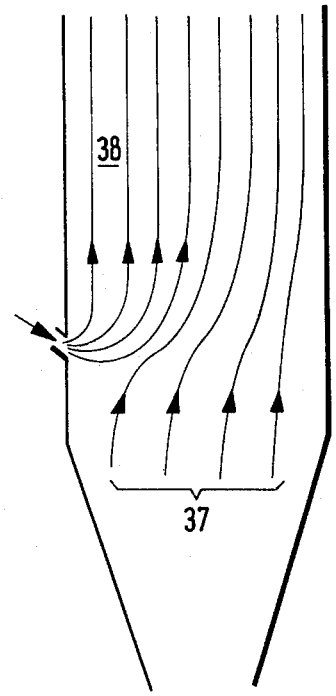
FIG. 3 is a diagram of gas flows through the furnace of FIG. 1 when the furnace is operated according to the settings depicted in FIG. 2.
Figure 5:
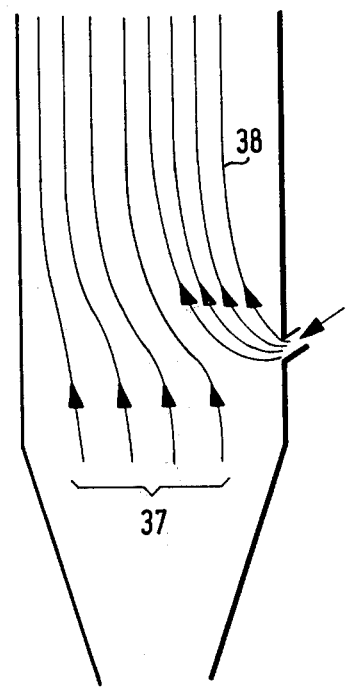
FIG. 5 is a gas flow diagram similar to that of FIG. 3 showing the gas flows when the valves are set as depicted in FIG. 4.

FIGS. 2 to 5 diagrammatically show how the problem of preventing excessive cooling in a region of the cross-section of the reduction zone is solved by shutting off the gas flow to the gas passages 12 in segments. For example, the bustle 11 may consist of three (or more) sector-shaped segments 34, 35 and 36 which are not joined together and which can be shut off by respective hot gas slide valves 31, 32 and 33 from the annular supply conduit 41 supplying hot reduction gas, or to which segments 34, 35 and 36 the supply of gas can be throttled by means of the slide valves. The gas supply conduit 41 is connected to the hot reducing gas supply pipe 10. The cross-section of the shaft may be imagined as being divided into sectors 42, 43 and 44 which are respectively associated with the sector-shaped bustle segments 34, 35 and 36. If, as shown in FIG. 2, the supply of gas to segment 34 of the bustle is shut off by closing slide valve 31, then the reducing gas can only enter the reduction zone through the gas passages 12 of segments 35 and 36, so that the gas is injected in a radially asymmetric flow which results in the flow pattern shown in FIG. 3. The upwardly moving gas flows denoted by flow lines 37 are predominantly displaced into sector 42 of the cross-section of the reduction zone by the reducing gas 38 which is injected at one side of the furnace. This causes this part of the furnace cross-section to be cooled down in the lower regions as heat is taken from the hot sponge iron to heat the gas rising out of the cooling zone to carry out the following reactions:

$$CH_4 + CO_2 \rightleftharpoons 2CO + 2H_2$$

$$CH_4 + H_2O \rightleftharpoons CO + 3H_2$$

$$CH_4 \rightleftharpoons C + 2H_2$$

After a certain period of time, the apparatus must be switched over so that the cooled portion of the cross-section of the burden is again heated by the reduction gas, while another portion of the cross-section of the burden is cooled. This is effected in the manner shown in FIGS. 4 and 5 by shutting off the segment 35 by closing hot gas slide valve 32. In this case the slide valve 32 closes while the slide valves 31 and 33 are open. The sponge iron burden acts as a heat exchanger. The downwardly moving burden is used in sectors as a regenerator, with the upwardly flowing hot reducing gas serving as a heating medium, the downwardly moving burden material storing the heat and then yielding it to the natural gas-top gas mixture, as sensible heat for heating the gas mixture and as reaction heat for the natural gas cracking reaction.

If the hot gas slide valves 31 to 33 are successively opened and closed at the correct speed, the flow rate of the gases in the furnace is not changed. The temperature field pattern in the furnace has a slow rotary movement as the particles of the burden are alternately subjected to the hot gas, then for a given period of time to the cold gas which rises out of the lower part of the furnace, then again to the hot reduction gas. This provides a degree of iron ore reduction which is virtually uniform over the entire burden in the furnace. Alternatively, instead of fully shutting off one of the hot gas slide valves, the gas flow may be reduced to a segment by only throttling its respective hot gas slide valve.

Figure 6:
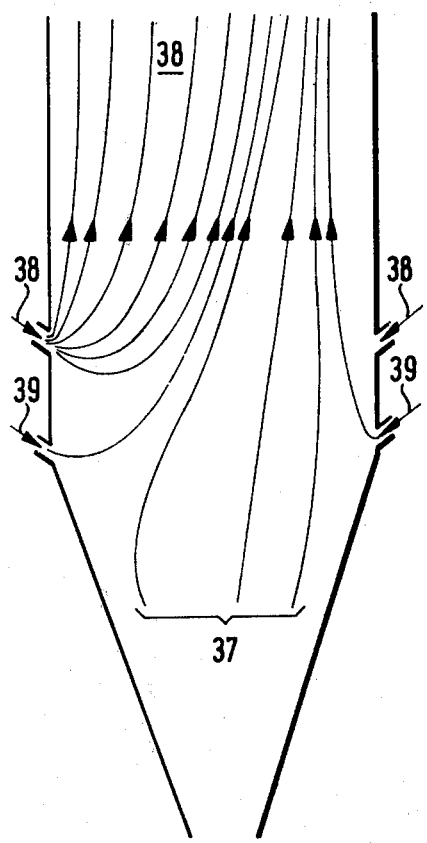
FIGS. 6 and 7 are gas flow diagrams showing alternative means of operating the furnace.
Figure 7:
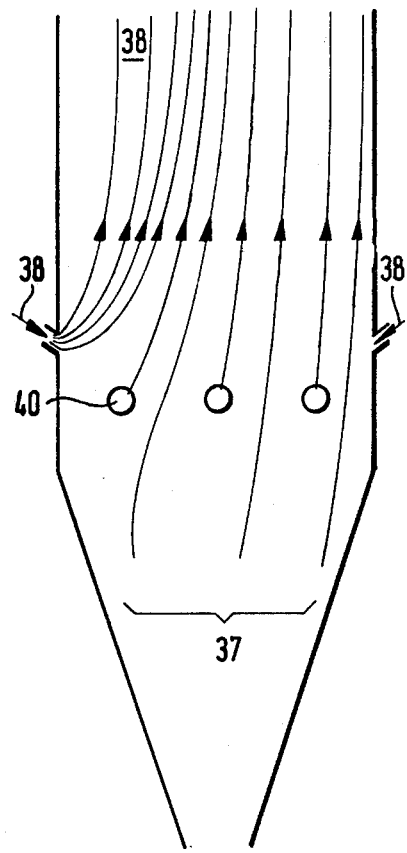

FIGS. 6 and 7 are diagrammatic views showing two further possible ways of successively displacing the rising cooling gas flow into different regions of the cross-section of the reduction zone, by means of a hot reducing gas flow which varies periodically in direction and/or a reducing gas flow which varies periodically in strength, velocity, or flow rate when the hydrocarbon-top gas mixture is injected either through horizontal pipes or through a second ring of nozzles below the plane in which the hot reducing gas is injected. In the drawings, reference numeral 37 denotes the gas flows which rise out of the cooling zone, reference numeral 38 denotes the reducing gas which is injected from the periphery, reference numeral 39 denotes a natural gas or natural gas-top gas mixture which is injected from the periphery, and reference numeral 40 denotes pipes corresponding to the pipes 23 in FIG. 1, through which natural gas or a natural gas-top gas mixture is injected. FIGS. 6 and 7 show a condition corresponding to that shown in FIG. 3. After a predetermined period of time, the hot reducing gas flow, and, insofar as concerns the apparatus shown in FIG. 6, also the natural gas flow, is injected from a different direction so that the rising gas flow is displaced into a different segment of the cross-section of the reduction zone.

As a specific example of the operation of this invention, iron ore is reduced in a shaft furnace at a temperature of 850° C. by reaction with a mixture of hydrogen and carbon monoxide, which for the major part is produced by cracking methane with the carbon dioxide of recycled top gas. About 1700 Nm³ of reduction gas is required per ton of reduced sponge iron. The natural gas consumption is 3.1 Gcal $H_u$/per t ($H_u$=lower calorific heating value) of sponge iron. Nonety-one percent (91%) of the iron is present in the sponge iron as metal, with 9% in the form of oxide.

When natural gas is injected as shown in FIG. 7, about 300 Nm³ of reduction gas and about 12 kg of carbon are additionally produced per ton of sponge iron of normal production, which quantities are sufficient for the production of an additional amount of about 180 kg of sponge iron and an increase of about 1% in the carbon content. For this purpose, about 64 Nm³ of natural gas must be injected below the shaft furnace reduction zone, and about 32 Nm³ of top gas must flow upwardly into the reduction zone.

Figure 8:
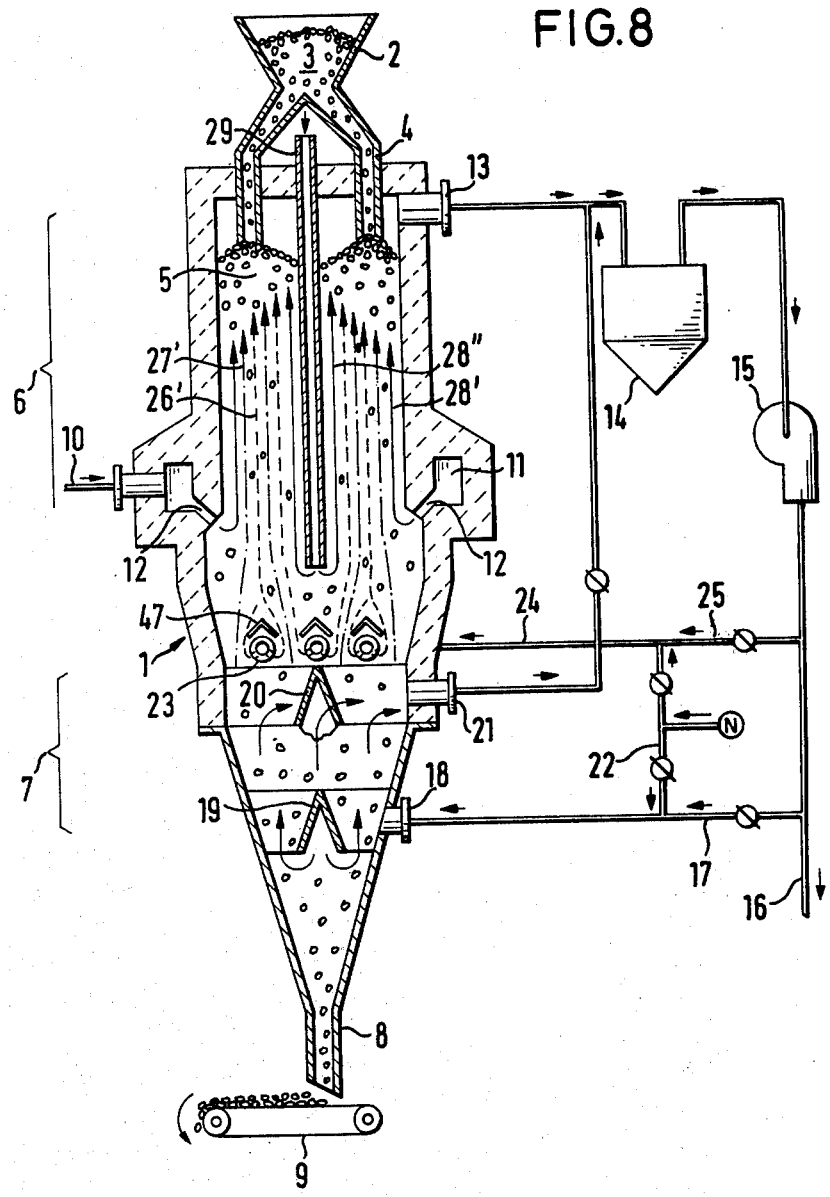
FIG. 8 is a schematic vertical section of a shaft furnace and related equipment for carrying out an alternative process in accordance with the invention.

In another embodiment of the invention, as shown in FIG. 8, instead of injecting all of the reduction gas from the periphery of the shaft furnace, some gas is injected through a pipe 29 which is disposed axially in the shaft furnace and which is arranged centrally, or a plurality of pipes, with a fluctuating flow velocity, that is, in a pulsating manner, the discharge opening of the pipe or pipes 29 being disposed above the horizontal gas distributor pipes 23, at about the lower end of the reduction zone 6. During the operation of injecting reduction gas through pipe 29, the flow conditions shown by lines 26', 27', 28' and 28" are produced. The middle zone is kept at the required temperature by the axially supplied reduction gas 28". The gas distributor pipes 23 are protected against the downwardly moving burden in the furnace by protective cover members 47 above the pipes. As already mentioned, more economical utilization of the heat content of the sponge iron is possible if the ratio of the hydrocarbon-top gas mixture is adapted according to the temperature of the sponge iron in the respective zone. The manner in which such adaptation is to be effected will be seen from the test results set out in Table I.

A number of tests were carried out in order to study the influence of temperature and ratio of top gas to natural gas in the cracking of natural gas in the presence of sponge iron pellets. In each of the tests, the intake composition of the gas mixture introduced into the sponge iron pellets and the outlet composition of the gas mixture leaving the pellets, were determined.

TABLE

Results from the tests of natural gas cracking in sponge iron

| Temp. | Top gas/ natural gas Ratio | Moisture content | Intake Compositions - % | | | | Outlet Compositions - % | | | |
|---|---|---|---|---|---|---|---|---|---|---|
| | | | $CH_4$ | CO | $CO_2$ | $H_2$ | $CH_4$ | CO | $CO_2$ | $H_2$ |
| 900° C. | 0/100 | 19.4% | 82.8 | 0 | 1.1 | 0 | 3.5 | 9.95 | 0 | 80.7 |
| 820° C. | 0/100 | 19.4% | * | * | * | * | 13–16 | 9.5 | 0.05 | 69–66.5 |
| 750° C. | 0/100 | 19.4% | * | * | * | * | 36 | 8.4 | 0.6 | 47.5 |
| 900° C. | 0/100 | 18.5% | * | * | * | * | 4.2 | 6.5 | 0 | 82.3 |
| 480° C. | 0/100 | 17.7% | 82.3 | 0 | 1.0 | 0 | 79.4 | 0.4 | 1.0 | 3.8 |
| 550° C. | 0/100 | 17.7% | 82.4 | 0 | 1.0 | 0 | 76.5 | 1.6 | 1.1 | 4.4 |
| 630° C. | 0/100 | 17.7% | 82.4 | 0 | 1.0 | 0 | 74 | 3.77 | 0.95 | 8.3 |
| 690° C. | 0/100 | 17.7% | 81.5 | 0 | 1.0 | 0 | 71 | 2.1 | 0.9 | 9.0 |
| 750° C. | 0/100 | 17.7% | 83.8 | 0 | 1.3 | 0 | 62 | 5.0 | 0.7 | 16.4 |
| 710° C. | 0/100 | 17.7% | 81.5 | 0 | 1.0 | 0 | 71 | 2.4 | 0.8 | 10.9 |
| 700° C. | 0/100 | 17.7% | 81.5 | 0 | * | 0 | 75 | 0.6 | 0.6 | 6.5 |
| 700° C. | 50/50 | None | 52 | 9.7 | 6.0 | 17.8 | 50.7 | 12.0 | 4.7 | 18.0 |
| 710° C. | ½ | None | 60 | 7 | 5 | 12 | 50 | 14 | 1 | 20 |
| 660° C. | ½ | None | 60 | 5 | 4.6 | 10 | 57 | 10 | 3.4 | 14 |
| 610° C. | ½ | None | 72 | 2.5 | 2.6 | 5.3 | 70 | 4.2 | 1.9 | 6.5 |
| 550° C. | ½ | None | 62.5 | 7.0 | 4.8 | 12.3 | 63.5 | 5.7 | 4.9 | 11.3 |
| 500° C. | ½ | None | 60.4 | 7.2 | 4.6 | 13.1 | 61.9 | 5.2 | 5.2 | 12.9 |

TABLE-continued

Results from the tests of natural gas cracking in sponge iron

| Temp. | Top gas/ natural gas Ratio | Moisture content | Intake Compositions - % | | | | Outlet Compositions - % | | | |
|---|---|---|---|---|---|---|---|---|---|---|
| | | | CH$_4$ | CO | CO$_2$ | H$_2$ | CH$_4$ | CO | CO$_2$ | H$_2$ |
| 605° C. | ½ | None | 60 | 7 | 4.7 | 12.5 | 62 | 7.3 | 4.3 | 11.7 |
| 600° C. | 0/100 | 17.7% | 83 | 0 | 1 | 0 | 76 | 0.4 | 0.5 | 7 |

*not determined

As can be seen from Table I, a gas mixture with stoichiometric proportions of CH$_4$ and CO$_2$ is no longer reacted at sponge iron temperatures of 700° C. or lower. Therefore, if a waste gas or top gas enriched with methane is introduced into the lowermost cooling section of the shaft furnace, in accordance with the method disclosed in DAS No. 1 783 180, the methane cracking action can only occur above a temperature of 700° C., even if the waste gas is enriched with methane to the desired stoichiometric ratio, and the heat content of the sponge iron below 700° C. remains unused for the production of reduction gas.

As can be seen from Table I, at a temperature of 660° C., reaction of the natural gas occurs if the gas mixture contains about two-thirds natural gas and one-third top gas. Below about 600° C., only the following reaction occurs:

$$CH_4 \rightarrow C + 2H_2$$

This reaction occurs above about 470° C. However, it is retarded by relatively small amounts of waste gas, because of the dilution effect and the reverse reaction caused by the hydrogen content of the waste gas, so that the reaction will take place only in pure or slightly diluted natural gas.

The waste gas produced in the direct reduction operation has a sample composition similar to:

| CO$_2$ | H$_2$O | H$_2$ | CO | N$_2$ | CH$_4$ |
|---|---|---|---|---|---|
| 17.8% | 7.0% | 42.8% | 19.1% | 10.1% | 3.3% |

Therefore, besides carbon dioxide and steam, the waste gas also includes a significant proportion of hydrogen and carbon monoxide. This is the reason why as the temperature falls, the sponge iron must be supplied with a gas mixture which has an increasing proportion of natural gas and a decreasing proportion of top gas. In order to be able to make use of the heat content of the sponge iron below a temperature of 600° C. for natural gas cracking, the natural gas must be in concentrated form, or only slightly mixed with waste gas, when it is injected into the reduction furnace cooling zone.

It is readily apparent from the above description that the present invention provides a process and apparatus which achieve the principal and ancillary objects set forth above. Other alternative embodiments are possible without departing from the spirit of the invention, and no limitations are to be inferred except as specifically set forth in the appended claims.

What is claimed is:

1. A process for the direct reduction of iron ores in a reduction furnace which is charged from above with iron ores, in particular a shaft furnace, wherein hot reduction gas is blown into the reduction zone, wherein at least a part of the waste gas which is taken from the shaft furnace above the reduction zone is returned, after a cleaning or preparing operation and with the addition thereto of hydrocarbons, into the shaft furnace below the zone in which the hot reduction gas is blown into the furnace, characterized in that in the lower portion of the reduction zone (6) the rising waste gas flow (27, 37) which is mixed with hydrocarbons is successively displaced into different regions of the cross-section of the reduction zone by a flow of the hot reduction gas (28, 38), being a flow which varies periodically in direction and/or a flow which varies periodically in strength.

2. A process according to claim 1 characterized in that the hot reduction gas flow is injected radially asymmetrically in periodically varying directions.

3. A process according to claim 2 characterized in that the hot reduction gas flow is injected radially only in a respective sector-shaped region of the cross-section of the reduction zone and the position of said region is periodically displaced in one direction along the periphery.

4. A process according to claim 3 characterized in that a slowly rotating gas flow is produced by the periodic shut-down or reduction of the feed of the hot reduction gas into the reduction zone (6).

5. A process according to claim 1 in that part of the reduction gas is injected in a pulsating manner through at least one tube (29), at a fluctuating flow speed, the opening of which tube (29) is disposed substantially at the center of the shaft furnace (1).

6. A process according to claim 1 characterized in that the supply of hydrocarbon-waste gas mixture which is injected below the injection region for the hot reduction gas is so controlled that there is substantially no waste gas when the temperature of the gas flows rising within the shaft furnace is from 470° C. to 600° C. and the proportion of waste gas is at most approximately one third of the hydrocarbon content at a temperature of from 600° C. to 700° C.

7. A process according to claim 6 characterized in that the hydrocarbon-waste gas mixture is injected below the injection region for the hot reduction gas through horizontal pipes (23, 40) which are arranged in the shaft and which have gas mixture discharge openings which are distributed over the length of the pipes.

8. A process according to claim 7 characterized in that hydrocarbons mixed with up to 25% of the cleaned or prepared waste gas are injected through the horizontally disposed pipes (23, 40).

9. In a method for the direct reduction of iron ore in a reduction furnace having an upper reduction zone and a lower injection zone at the bottom thereof having means for injecting reducing gas selectively into a multiplicity of sector-shaped areas of the cross-section of the furnace, said method including withdrawing top gas from the top of the furnace above the reduction zone, scrubbing and cooling withdrawn top gas, and injecting cleaned top gas into the furnace beneath the injection zone to flow upwardly into the reduction zone, the improvement comprising:

(a) injecting hot reducing gas into said furnace radially into said sector-shaped areas of the cross-section of the furnace;

(b) periodically reducing the hot gas flow to a sector-shaped area; and (c) periodically changing the sectors into which said hot reducing gas is injected whereby the upwardly flowing top gas is successively displaced into different regions of the cross-section of the reducing zone.

10. A method according to claim 9 further comprising periodically changing the velocity of the hot reducing gas injected into said furnace.

11. A method according to claim 9 wherein said clean top gas is mixed with hydrocarbon gas to form a gas mixture before injection into said furnace.

12. A method according to claim 9 further comprising injecting natural gas into said furnace beneath the reduction zone.

13. A method according to claim 9 further comprising periodically stopping the reducing gas flow to one of said sector-shaped areas.

14. A method according to claim 9 further comprising feeding iron ore into the top of said furnace to form a burden therein, removing reduced sponge iron from the bottom thereof, and injecting a portion of the reducing gas downwardly into the center of said burden near the bottom of the reduction zone.

15. A method according to claim 14 wherein said portion of the reducing gas is injected downwardly at a fluctuating flow rate.

16. A method according to claim 11 wherein said furnace is provided with a cooling zone spaced beneath the injection zone, and said mixture is injected into said cooling zone.

17. A method according to claim 11 wherein the ratio of hydrocarbon gas to top gas in said mixture is controlled to vary from substantially all hydrocarbon when the rising gas mixture temperature is from about 470° C. to about 600° C. to about 3 parts hydrocarbon to 1 part top gas when the gas mixture temperature is from about 600° C. to about 700° C.

* * * * *